United States Patent [19]

Shimada et al.

[11] 4,235,656
[45] Nov. 25, 1980

[54] METHOD OF AND APPARATUS FOR FORMING A CORELESS ARMATURE WINDING FOR AN ELECTRIC MACHINE

[75] Inventors: Sachio Shimada, Yokohama; Akio Tsunaki; Tatsuo Furuichi, both of Tokyo; Tsuneyuki Hayashi, Chigasaki, all of Japan

[73] Assignee: Sony Corporation, Tokyo, Japan

[21] Appl. No.: 15,107

[22] Filed: Feb. 26, 1979

[30] Foreign Application Priority Data

Feb. 28, 1978 [JP] Japan .................................. 53-22200
Feb. 28, 1978 [JP] Japan .................................. 53-25057

[51] Int. Cl.$^2$ ........................................... H02K 15/04
[52] U.S. Cl. ...................... 156/175; 29/33 L; 29/564.5; 29/598; 156/425; 242/7.04; 310/266
[58] Field of Search ............. 29/596, 598, 605, 564.5, 29/33 L; 140/92.1, 92.2; 242/7.03, 7.04, 1.1 R, 1.1 A, 1.1 E, 7.21, 7.02; 156/173, 175, 425; 310/266

[56] References Cited

U.S. PATENT DOCUMENTS 4,151,964  5/1979  Kaufmann ........................... 242/7.04

FOREIGN PATENT DOCUMENTS 673793  6/1952  United Kingdom ...................... 29/598

Primary Examiner—Michael W. Ball

Attorney, Agent, or Firm—Lewis H. Eslinger; Alvin Sinderbrand

[57] ABSTRACT

A method and apparatus for forming a coreless armature winding for an electric machine, such as a motor, having two or more poles. A source of wire is revolved in a fixed orbit about a rotatable cylinder, the axis of this orbit being inclined with respect to the longitudinal axis of the cylinder. The wire is guided about first and second guide members positioned at opposite spaced apart locations on the surface of the cylinder. These guide members define the opposite ends of the coreless armature winding such that when the wire is wound thereabout, one complete turn is formed on the surface of the cylinder. The cylinder is rotated about its longitudinal axis in synchronism with the revolution of the wire, the cylinder being rotated by a predetermined angle corresponding to the pitch of the winding so that, as the wire continues to revolve, successive skewed turns are formed on the surface of the cylinder. The guide members are rotated as the cylinder rotates, and after a predetermined number of turns have been formed, the guide members are returned to their respective initial positions. Then, the foregoing operation is repeated until a complete armature has been formed. In one embodiment, the guide members are returned to their respective initial positions after each complete turn is formed. In accordance with another embodiment, the guide members are returned to their initial positions after a number of turns corresponding to a pole width have been formed.

23 Claims, 17 Drawing Figures

METHOD OF AND APPARATUS FOR FORMING A CORELESS ARMATURE WINDING FOR AN ELECTRIC MACHINE

BACKGROUND OF THE INVENTION

This invention relates to a method and apparatus for forming a coreless armature winding for an electric machine and, more particularly, to such a method which can be readily implemented by automatic machinery, and to that machinery.

A coreless armature winding is a winding of wire that is not supported on or wound about a core. By eliminating the core, the overall mass and weight of the machine, such as a motor, advantageously is reduced. Because of this, motor operation is improved, and the control circuitry thereof can be simplified.

One type of technique for forming such a coreless armature winding uses a mandrel whose surface is honeycombed for forming and shaping the armature winding accordingly. The wire is wound about the honeycombed surface of the mandrel so as to form a cylindrical, honeycombed winding. Then, this winding is removed from the mandrel and the cylinder is flattened. This results in a winding that is substantially belt-shaped, yet retains the honeycomb configuration. Opposite ends of this belt shape are joined end-to-end so is to form the cylindrical armature winding of honeycomb shape. Unfortunately, forming such a coreless armature winding in accordance with the aforementioned manner requires a large number of intricate steps. Hence, this technique is time consuming and, thus, expensive. Furthermore, only low volumes of production can be attained by using this method. Also, a relatively large number of manual steps are needed, such as the removal of the honeycombed winding from the mandrel, thus making it difficult to automate this technique. Consequently, this method is not suitable for the large-scale manufacture of coreless armature windings.

In accordance with another technique for forming a coreless armature winding, a cylindrical winding surface is provided with a number of radially projecting guide pins. These pins are arranged in accordance with the winding configuration and also with the number of poles that the winding is to have. Then, the wire which is used to form the winding is wound about the guide pins. Each pin may be associated with a plurality of different turns so that the wire which is wound about the cylindrical winding surface exhibits many crossovers. This technique results in a cylindrical armature winding of the so-called skew winding type. Although this method provides a winding which appears as a neat arrangement on the winding surface of the cylinder, the fact that several turns of wire overlap at each guide pin presents the danger that the insulation which coats the wire may rub away or peel off. This means that there is a high likelihood of a short-circuit between adjacent layers of the winding. Furthermore, since a number of turns is wound about each guide pin, the size, or thickness, of the wire, and particularly the outer diameter thereof, must be limited. This can result either in an undesirably thin coating of insulation or an undesirably thin gauge of wire.

OBJECTS OF THE INVENTION

Accordingly, it is object of the present invention to provide an improved method and apparatus for forming a coreless armature winding, whereby the aforenoted problems attending prior art techniques are avoided.

Another object of this invention is to provide an improved method and apparatus for forming a coreless armature winding in which the winding is provided with a uniform pitch and wherein the turns form a skew winding.

A further object of this invention is to provide a method of forming a coreless armature winding which can be automated, and the apparatus for carrying out that method, whereby such windings are formed efficiently at high productivity levels and at relatively lower costs.

An additional object of this invention is to provide a method for forming a coreless armature winding and automatic or semi-automatic apparatus for carrying out that method.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus for forming a coreless armature winding are provided. A source of wire is revolved in a fixed orbit about a rotatable cylinder, the axis of this orbit being inclined with respect to the longitudinal axis of the cylinder. First and second guide members positioned at opposite spaced apart locations on the surface of the cylinder are used to guide the wire as it is wound about the cylinder, these guide members also defining the opposite ends of the coreless armature winding such that one complete turn of wire is formed about the surface of the cylinder as it is wound about these guide members. The cylinder is rotated, in synchronism with the revolution of the wire, by a predetermined angle corresponding to a pitch of the winding so that, as the wire continues to revolve, successive skewed turns of the wire are formed on the surface of the cylinder. The guide members are rotated with the cylinder, and after a predetermined number of turns have been formed, the guide members are returned to their respective initial positions. Then, the foregoing operation is repeated until the complete armature winding is formed. In accordance with one embodiment, the guide members are returned to their respective initial positions after each complete turn is formed. In accordance with another embodiment, the guide members are returned to their respective initial positions after a number of turns, such as the number of turns included in a pole width, are formed.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
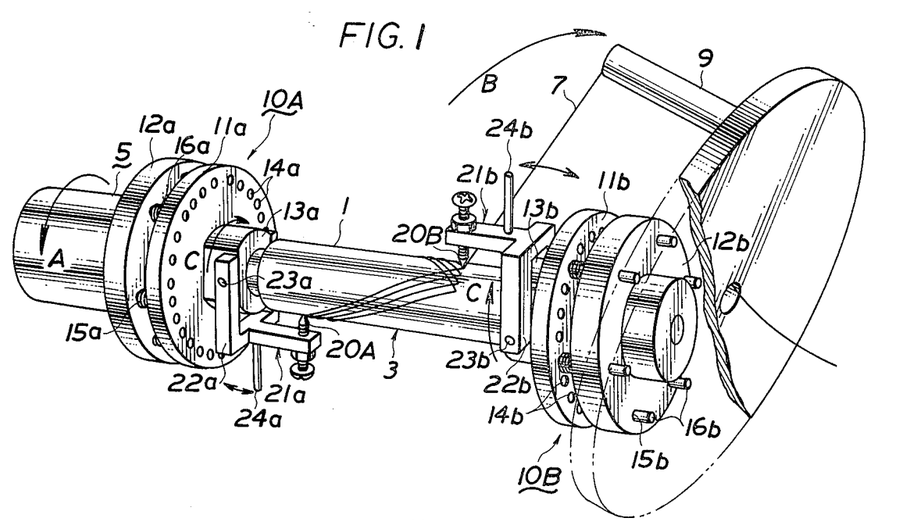
FIG. 1 is a perspective view of one embodiment of apparatus which is capable of carrying out the method of the present invention.

Referring now to the drawings, and in particular to FIG. 1, there is illustrated one embodiment of apparatus capable of carrying out the method of the present invention for forming a coreless armature winding for an electric machine. It is to be understood that, as used herein, the term "electric machine" refers to an electric motor or to an electric generator. Such a machine may be provided with two or more poles, and the armature winding will be formed so as to be compatible with such number of poles. The illustrated apparatus is comprised of a winding cylinder 3, a drive shaft 5 for rotating the cylinder, a source of wire 9, guide members 20A and 20B, and indexing mechanisms 10A and 10B. Cylinder 3 includes a surface 1 about which a wire 7 is wound in uniform pitch to form a skewed winding. Drive shaft 5 is mechanically coupled to cylinder 3 and is rotatable by suitable means (not shown) so as to rotate the cylinder. In one embodiment, drive shaft 5 may be provided with a mandrel for rotatably supporting cylinder 3.

Source 9 of wire 7 is a so-called flier and is rotatably driven by suitable means (not shown). When so driven, flier 9 revolves in an orbit about cylinder 3, the axis of this orbit being inclined with respect to the longitudinal axis of the cylinder. This revolution of the flier results in the skewed winding of wire 7 from, for example, the bottom portion of surface 1 at one end of cylinder 3 upward toward the top portion of surface 1 at the other end of the cylinder, and then back down to the bottom portion of the surface of the cylinder.

Guide members 20A and 20B may comprise pins, these pins being suitably supported by support members 21a and 21b, respectively, at opposite spaced apart locations on surface 1 of cylinder 3. As wire 7 revolves about cylinder 3, pins 20A and 20B intercept the wire such that the wire is wound about the pins and, thus, is doubled back in skewed relation about the surface 1 of cylinder 3. Support members 21a and 21b are mechanically coupled to indexing mechanisms 10A and 10B, respectively. Indexing mechanism 10A is comprised of a pair of flange elements, or discs, 11a and 12a. Flange element 12a is mechanically coupled to drive shaft 5 so as to be rotatable therewith. Flange element 11a is coupled to a sleeve 13a provided about a portion of drive shaft 5 or, alternatively, the mandrel which extends into cylinder 3. Flange element 11a is provided with a circular array of apertures, or holes 14a disposed at a predetermined radius of the flange element. Flange element 12a is provided with a circular array of holes, or apertures, 15a, the number of apertures 15a being significantly less than the number of apertures 14a. As an example, 25 apertures 14a may be provided in flange element 11a and six apertures 15a may be provided in flange element 12a. A pin, or connecting rod, 16a is adapted to pass through an aperture 15a to be inserted into a selected one of apparatus 14a. Of course, when pin 16a is so inserted, flange elements 11a and 12a are mechanically coupled to each other, and when so linked, the rotation of flange element 12a by the rotation of drive shaft 5 serves to rotate flange element 11a.

Indexing mechanism 10B is of similar construction to aforementioned indexing mechanism 10A. Hence, indexing mechanism 10B is comprised of a pair of flange members 11a and 12b, with flange member 12b being mechanically coupled to that portion of drive shaft 5 which emerges from cylinder 3. Flange member 11b is coupled to a sleeve 13b, this sleeve being similar to sleeve 13a in that it is rotatable about the mandrel. Flange element 11b is provided with a circular array of apertures 14b, such as twenty-five apertures, provided on a predetermined radius of the flange element; and flange element 12b is provided with a circular array of apertures 15b, such as six apertures, provided on the same radius. A pin, or connecting rod 16b, is adapted to pass through an aperture 15b in flange element 12b to be inserted into a selected aperture 14b in flange element 11b.

Support members 21a and 21b, which are adapted to support guide pins 20A and 20B, respectively, are pivotally mounted on sleeves 13a and 13b via pivot pins 23a and 23b, respectively. Each support member is comprised of a U-shaped base 22a, 22b, through which pivot pins 23a and 23b, respectively, extend. In addition, a support arm extends from the U-shaped base such that, when viewed from above, the support arm and U-shaped base appear as a T-shape. An operating member, or pin, 24a, 24b, extends from the arm of support members 21a and 21b, respectively. The support arms may include threaded apertures through which guide pins 20A and 20B are screwed. This permits the length of each guide pin from its support arm to surface 1 of cylinder 3 to be adjusted, as desired.

The manner in which the apparatus illustrated in FIG. 1 operates now will be described with reference to FIGS. 2-6. Drive shaft 5, and thus, cylinder 3, is driven in synchronism with the revolution of flier 9. That is, as flier 9 makes one complete orbit about the cylinder, the cylinder is rotated through a predetermined angle equal to the pitch of the armature windings wound thereon. If flier 9 revolves in the direction indicated by arrow B, cylinder 3 is rotated in the direction indicated by arrow A. Let it be assumed that N turns ultimately are wound upon the cylinder to form the complete armature winding. Hence, the pitch of these windings is equal to (1/Nth) of a full rotation. That is, cylinder 3 rotates (1/Nth) of a full rotation with each revolution of flier 9. Initially, a pin 16a is passed through a predetermined aperture 15a in flange element 12a and inserted into a predetermined aperture 14a in flange element 11a. Likewise, a pin 16b is passed through a predetermined aperture 15b in flange element 12b to be inserted into a predetermined aperture 14b in flange element 11b. Thus, as drive shaft 5 is rotated through its predetermined angle in the direction of arrow A while flier 9 makes one full revolution in the direction of arrow B, guide pins 20A and 20B likewise are driven in the direction indicated by arrow A because of the coupling between flange elements 11a, 11b and flange elements 12a, 12b, respectively, the latter flange elements being driven by drive shaft 5.

Figures 2, 3:
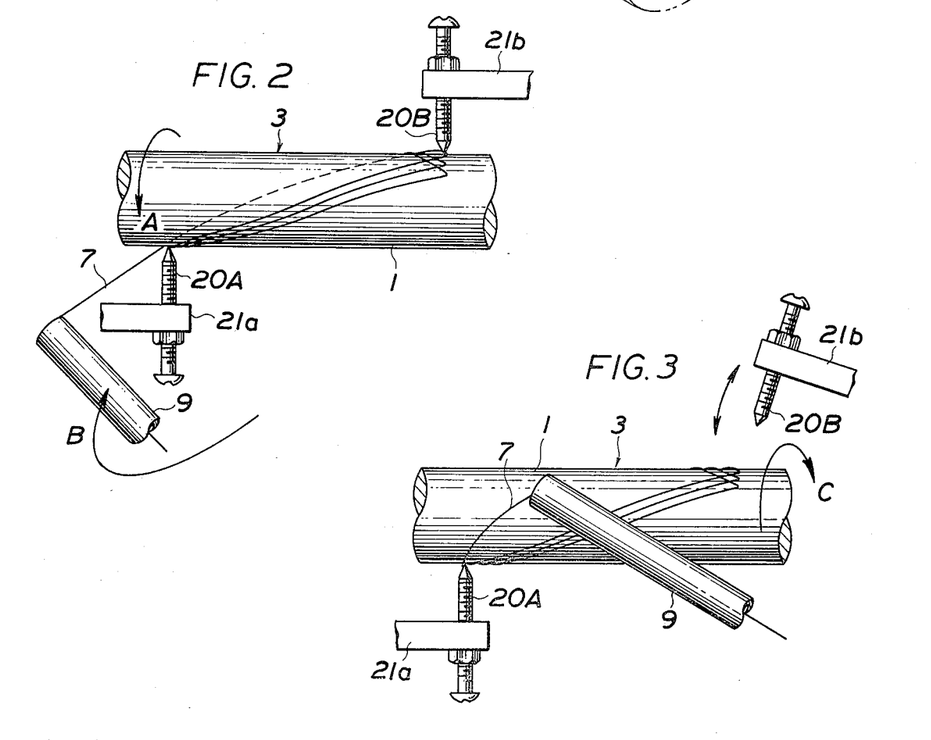
FIG. 2 is a side view of a portion of the apparatus representing one stage of the winding operation.
FIG. 3 is a side view of a portion of the apparatus representing another stage of the winding operation.

Let it be assumed that flier 9 passes behind cylinder 3, as viewed in the drawings, such that wire 7 extends from guide pin 20B toward guide pin 20A, as shown in FIG. 2. This wraps a turn about guide pin 20B. That is, a turn of wire 7 is doubled back about pin 20B to form a turn which is skewed with respect to the longitudinal axis of cylinder 3, which turn is wrapped about surface 1 of this cylinder. Of course, as flier 9 revolves, cylinder 3 rotates in sychronism therewith so as to displace the turn being formed on surface 1 of the cylinder from the preceding turn which had been formed thereon, this displacement being equal to the pitch of the turns.

After wire 7 is doubled back about guide pin 20B, flier 9 continues in its orbit about cylinder 3 so as to commence passing in front of the cylinder, as shown in FIG. 3. This, in turn, winds wire 7 about guide pin 20A so as to double back the wire. At this time, both guide pins 20A and 20B will have been rotated in the direction of arrow A by (1/Nth) of a full rotation by reason of the coupling between drive shaft 5 and indexing mechanisms 10A and 10B. Before flier 9 revolves to the point wherein wire 7 once again is wrapped about guide pin 20B, this guide pin is returned to its initial position, that is, it is returned to the position occupied thereby just prior to the commencement of the turn of wire which had been formed on the surface of cylinder 3. This returning of guide pin 20B to its initial position is achieved by pivoting support member 21B about pivot pin 23B so as to withdraw guide pin 20B from surface 1 of cylinder 3, as shown in FIG. 3. Then, the pin 16b, which had been inserted into one aperture 14b in flange element 11b, is removed from that aperture so as to enable flange element 11b to rotate with respect to flange element 12b. Flange element 11b is rotated in the direction opposite to the direction indicated by arrow A, that is, this flange element is rotated in the direction indicated by arrow C of FIG. 3. When the next adjacent aperture 14b is rotated into alignment with the pin 16b, this pin is inserted therein so as once again to couple, or lock, flange elements 11b and 12b together. This rotation of flange element 11b in the direction of arrow C also rotates sleeve 13b to which support member 21b, and thus guide pin 20B, is coupled. Hence, guide pin 20B is rotated in the direction of arrow C, and this rotation is equal to a predetermined angle equal to the pitch of the windings formed on the surface of cylinder 3. That is, while cylinder 3, together with guide pin 20B, has rotated by (1/Nth) of a complete rotation, guide pin 20B now is returned to its intial position by being rotated through this same (1/Nth) of a complete rotation, but in the opposite direction. Then, support member 21b is pivoted so as to return guide pin 20B into contact with the surface of cylinder 3, as shown in FIG. 4.

It should be appreciated that apertures 15b provided in flange element 12b may be offset with respect to apertures 14b provided in flange element 11b. After a pin 16b is withdrawn from a particular aperture 14b, flange element 11b may be rotated in the direction of arrow C until a different aperture 15b is aligned with another aperture 14b, and a pin 16b then passes through these aligned apertures to establish the proper angle through which flange element 11b is rotated. For example, for the proper angular displacement of flange element 11b, a pin 16b positioned at the twelve o'clock location in flange 12b may be withdrawn from an aperture 14b, and then flange element 11b may be rotated until a pin 16b located at the two o'clock position of flange element 12b can be inserted into an aligned aperture 14b. The pin which had been located at the twelve o'clock position of flange element 12b then will not be inserted into another aperture 14b until flange element 11b undergoes six successive angular displacements, each such angular displacement being equal to one pitch of the winding.

Figures 4, 5:
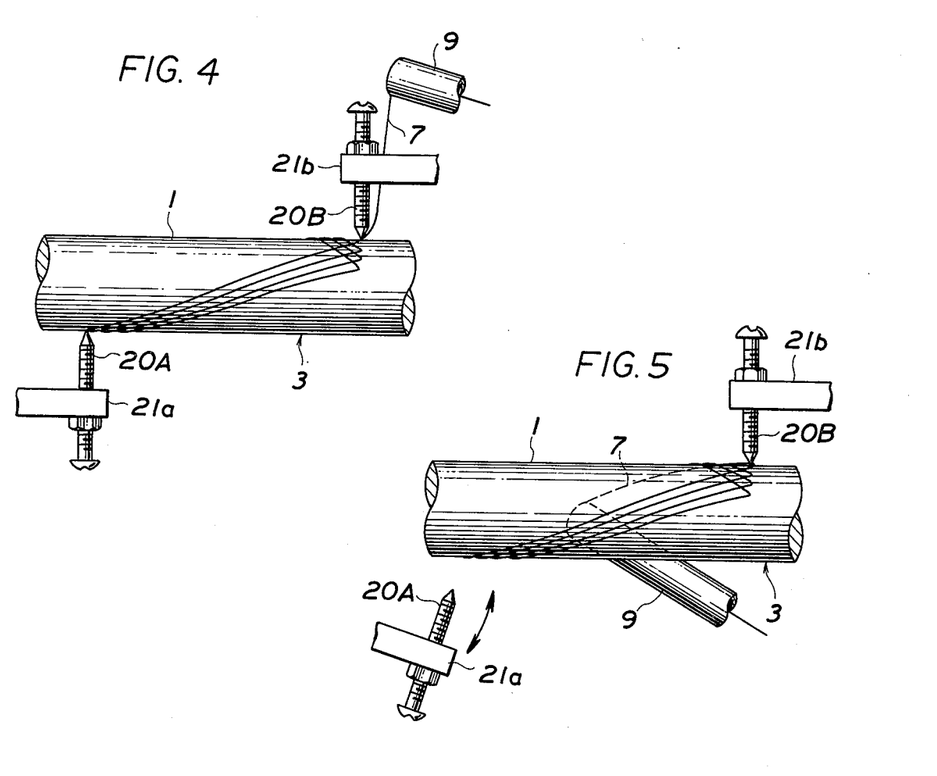
FIG. 4 is a side view of a portion of the apparatus representing yet another stage in its operation.
FIG. 5 is a side view of a portion of the apparatus representing yet another stage of its operation.

Once guide pin 20b is returned to the surface of cylinder 3, as shown in FIG. 4, flier 9 continues in its orbit so as to wrap wire 7 about this guide pin, as shown in FIG. 5. That is, the return of guide pin 20B to the surface of cylinder 3 enables wire 7 to be doubled back about the guide pin. Then, the run of wire 7 which now extends between guide pins 20A and 20B is temporarily fixed to cylinder 3 by, for example, thermal adhesion, or other conventional adhesive techniques. This can be readily achieved if wire 7 is provided with a thermally adhesive coating, which coating is activated by the application of heat thereto. It may be appreciated that, by fixing this run of wire 7 to cylinder 3, this run is not disturbed if guide pin 20A is pivoted away from the surface of the cylinder.

Figure 6:
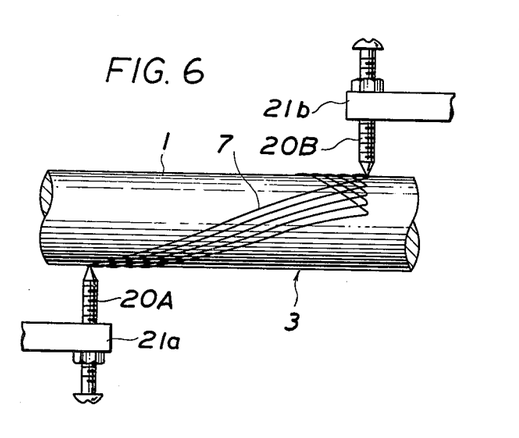
FIG. 6 is a side view of a portion of the apparatus representing a still further stage of its operation.

Flier 9 continues in its orbit and now passes behind cylinder 3, as shown in FIG. 5. As wire 7 is doubled back about guide pin 20B, guide pin 20A is pivoted away from the surface of the cylinder. This, of course, can be achieved by applying a suitable force on pin 24a (FIG. 1) such that support member 21a pivots about pivot axis 23a. When guide pin 20A is withdrawn from cylinder 3, the guide pin is returned to its initial position in a manner similar to that described hereinabove with respect to the return of guide pin 20B to its initial position. That is, the pin 16a which had been inserted into aperture 14a on flange element 11a is removed therefrom, and then this flange element is rotated with respect to flange element 12a until another pin 16a can be inserted into a different aperture 14a. Flange element 11a is rotated in the direction of arrow C by an amount equal to (1/Nth) of a complete rotation. Thus, the flange element, together with sleeve 13a coupled thereto, is rotated through a predetermined angle equal to one pitch of the winding. This rotation of sleeve 13a also rotates guide pin 20A, thus returning the guide pin to its initial position. That is, the guide pin now is rotated through an equal but opposite angle than that through which it had been rotated by drive shaft 5. When guide pin 20A is returned to its initial position, supported member 21a is pivoted about pivot axis 23a so as to bring the guide pin into contact with the surface of cylinder 3 once again. Flier 9 continues in its orbit so as to double back wire 7 about guide pin 20A, as shown in FIGS. 2 and 6. The run of wire 7 from guide pin 20B to guide pin 20A on the reverse side of the cylinder is temporarily fixed to the cylinder by, for example, thermal adhesion, as described above.

The foregoing operation is repeated for each successive half-orbit of flier 9. In this manner, successive turns of wire 7 are formed on the surface of cylinder 3 in synchronism with the revolution of the flier. As the flier completes one full orbit, cylinder 3 rotates by (1/Nth) of its full rotation. Furthermore, guide pins 20A and 20B alternately are returned to their respective initial positions so that each turn of wire 7 is intercepted by these guide pins to provide the winding with proper pitch. It is appreciated that guide pins 20A and 20B rotate in the same direction as cylinder 3. However, when flier 9 reaches a first position in its orbit, such as the position shown in FIG. 3, guide pin 20B is returned to its initial position, that is, it is rotated in the opposite direction through the same angle that cylinder 3 had been rotated. Then, when flier 9 reaches a second position in its orbit, such as shown in FIG. 5, guide pin 20A is returned to its initial position by rotating this guide pin in the opposite direction and through the same angle over which cylinder 3 had been rotated. When viewed from the right-hand end of cylinder 3, it is recognized that this cylinder rotates in the counterclockwise direction, and guide pins 20A and 20B are returned to their respective initial positions by being rotated in the clockwise direction. Each guide pin thus rotates by a predetermined angle in the counterclockwise direction and then rotates through this same angle in the clockwise direction.

Figure 7:
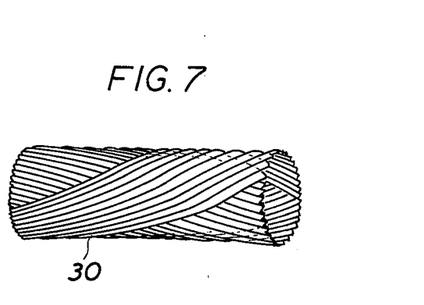
FIG. 7 is a prespective view of the coreless armature winding formed by the method and apparatus of this invention.

After cylinder 3 undergoes one complete rotation, the winding thus formed thereon is removed therefrom; and this winding has the configuration shown by winding 30 in FIG. 7. This winding is formed of N skewed turns of uniform pitch.

In the foregoing apparatus, it is appreciated that flier 9 revolves in a fixed orbit while cylinder 3 rotates. This rotation of the cylinder results in the skewed turns of uniform pitch. In forming each turn, the run of wire extending between the guide pins is temporarily fixed to cylinder 3 by, for example, thermal adhesion. If desired, each run of wire 7 may be adhered to those turns already formed on the cylinder, such adhesion being by, for example, thermal adhesion.

Figure 8:
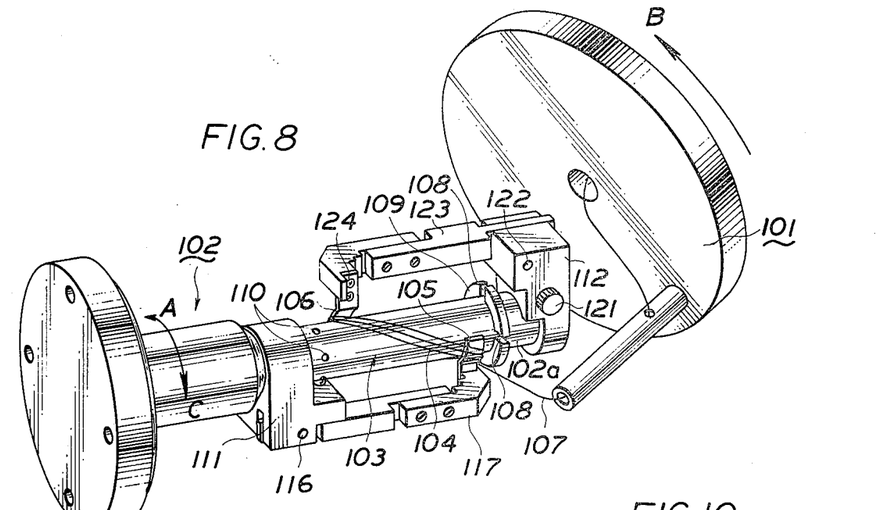
FIG. 8 is a perspective view of another embodiment of apparatus which can carry out the method of this invention.

Another embodiment of the present invention is illustrated in FIG. 8. This embodiment is comprised of a flier 101, a cylinder 103, a drive shaft 102, guide members 105 and 106, and support members 111 and 112. Flier 101 may be similar to aforedescribed flier 9 and is driven by suitable means (not shown) to revolve in a fixed orbit. Wire 107 is payed out from flier 101 as the latter revolves.

Drive shaft 102 preferably comprises a mandrel which is driven by suitable means (not shown) in synchronism with the revolution of flier 101. The drive shaft is inserted into cylinder 103 and extends therethrough so as to emerge from the opposite end of this cylinder as drive shaft portion 102a. Support members 111 and 112 are mounted upon drive shaft portion 102a, shown in FIGS. 8 and 9, at opposite ends of cylinder 103, so as to rotate with the rotation of the drive shaft. Support member 111 is provided with a support arm 117 pivotally coupled to a base of the support member by a pivot pin 116, this support arm extending substantially parallel to the longitudinal axis of cylinder 103. Similarly, support member 112 is provided with a support arm 123 which is pivotally coupled to a base of the support member by a pivot pin 122, this support arm 123 extending in a direction substantially parallel to the longitudinal axis of cylinder 103. Guide members 105 and 106 are secured to support arms 117 and 123, respectively, by, for example, screws, such as screws 124. Each guide member 105, 106 is an arcuate shaped member that is adapted to be disposed adjacent surface 104 of cylinder 103, the arcuate shape being concentric with this surface.

Figure 9:
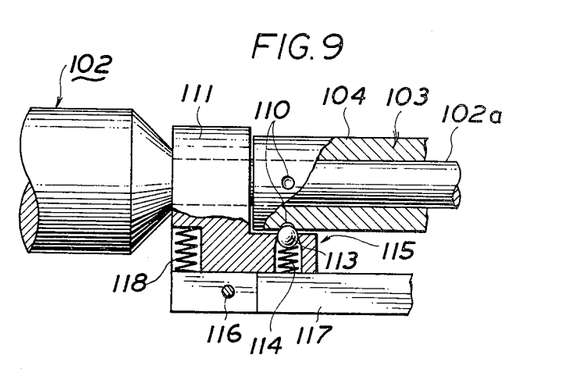
FIG. 9 is a side view of a portion of the apparatus shown in FIG. 8.

Referring to FIG. 9, support member 111 is provided with a slit therein for receiving an end portion of support arm 117, this portion being remote from guide member 105. A spring element 118 is provided between this end portion of support arm 117 and support member 111 so as to bias the support arm in a clockwise direction about pivot pin 116. This bias force urges guide member 105 toward the surface of cylinder 103. Cylinder 103 is provided with a circular array of apertures 110 disposed about the surface thereof. These apertures are uniformly spaced from each other and define successive pole widths. Support arm 117 is provided with a detent mechanism 115 comprised of a ball 113, such as a steel ball, biased by a spring 114 in the upward direction, as viewed in FIG. 9, so as to be inserted into each of apertures 110. This detent mechanism serves as a releasable coupling between support assembly 111 and cylinder 103 such that when the support assembly is rotated by drive shaft 102a, the releasable coupling between the rotating support assembly and cylinder 103 tends to rotate the cylinder in the same direction. Of course, when this coupling between support arm 117 and cylinder 103 is released, support assembly 111 is free to rotate with respect to the cylinder.

Figure 10:
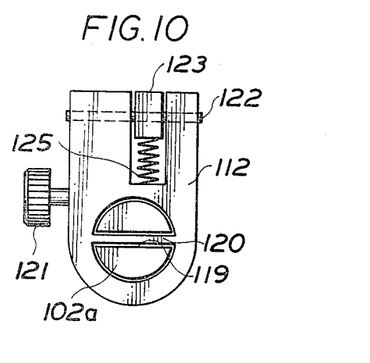
FIG. 10 is an end view of another portion of the apparatus of FIG. 8.

As best seen in FIG. 10, support assembly 112 is secured to drive shaft 102a by a tongue-and-groove coupling. In particular, the free end portion of drive shaft 102a, that is, the end portion thereof remote from support assembly 111, is provided with diametric groove 119. Support assembly 112 is provided with a tongue 120 which is insertable into groove 119. A set screw (not shown) is secured to a knob 121 and is adapted to be set against the peripheral circumference of drive shaft 102a so as to prevent longitudinal displacement of support member 112 with respect to the drive shaft. The tongue-and-groove coupling between drive shaft 102a and support member 112 results in rotation of the support member as the drive shaft is rotated. Support member 112 also is provided with a slit therein to receive support arm 123. A spring element 125 biases this support arm in the counterclockwise direction about pivot pin 122 (as viewed in FIG. 8) so as to urge guide member 106 against surface 104 of cylinder 103.

A flange member 109 is provided at one end of cylinder 103. This flange member includes a plurality of slots 108 cut therein, these slots being uniformly spaced about the flange member so as to define pole widths about the surface of cylinder 103.

In operation, flier 101 revolves in its fixed orbit in the direction indicated by arrow B. Drive shaft 102 rotates in the direction of arrow A in synchronism with the revolution of flier 101. Let it be assumed that ball 103 of releasable coupling 115 provided in support member 111 is inserted into an aperture 110 on the surface of cylinder 103. Hence, as drive shaft 102 rotates, cylinder 103 also rotates because of its coupling to the drive shaft via releasable coupling 115 and support assembly 111, the latter being driven by the drive shaft. As flier 101 completes one full orbit, drive shaft 102, together with cylinder 103, rotates through a predetermined angle corresponding to one pitch of the winding. If the winding is formed of N turns, then cylinder 103 rotates by (1/Nth) of a full rotation with each revolution of flier 101. In this manner, successive turns of wire 107 are skewed about the surface 104 of cylinder 103, adjacent turns being separated by the appropriate pitch.

Figure 11:
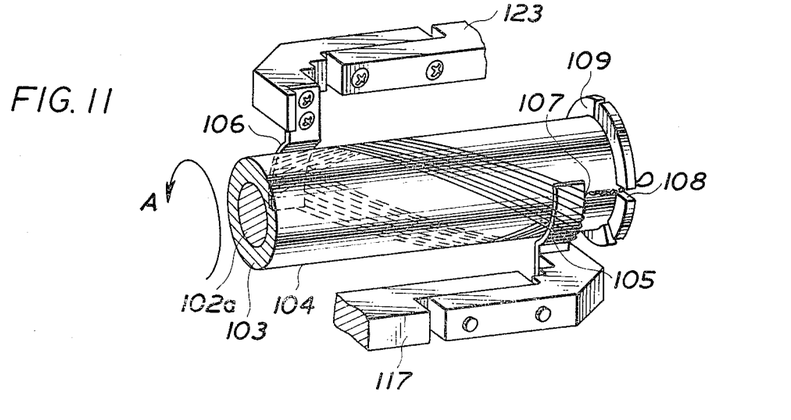
FIGS. 11-14 are perspective views of a portion of the apparatus representing various stages in the operation thereof.

Prior to forming the first turn of wire 107 about the surface of cylinder 103, a loop is formed at the free end of the wire, and this loop is inserted into a slot 108, as shown in FIG. 11. Then, flier 101 revolves in synchronism with the rotation of cylinder 103 to form a predetermineed number of uniformly spaced apart skewed turns on the surface of the cylinder, also as shown in FIG. 11. It is appreciated that flier 101 revolves at a uniform speed and, likewise, cylinder 103 is rotated at uniform speed. This results in forming each turn of wire 107 of equal length. Each turn of wire is wound about guide members 105 and 106, as shown, such that each turn is doubled back about each of the respective guide members. These guide members define the opposite ends of the armature winding which is formed.

Figure 12:
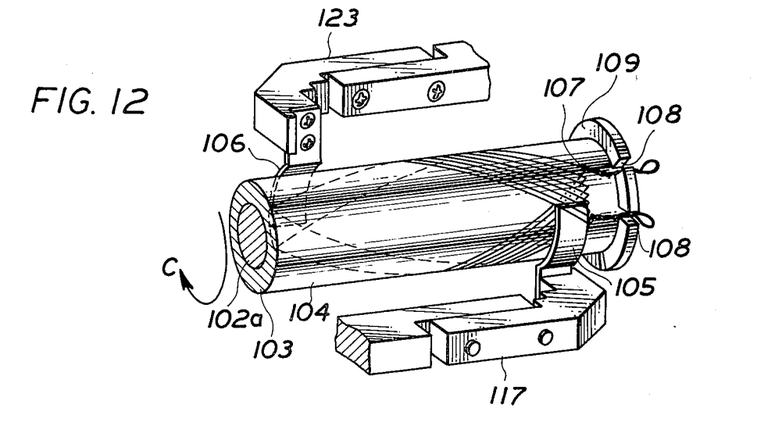

After a predetermined number of turns of wire 107 have been wound about guide members 105 and 106 over surface 104 of cylinder 103, as shown in FIG. 11, the rotation of drive shaft 102 is halted. At the same time, the revolution of flier 101 likewise is stopped. Cylinder 103 is maintained in its present position, and drive shaft 102 then is rotated in the opposite direction, as indicated by arrow C of FIGS. 8 and 12. This opposite rotation of drive shaft 102 releases ball 113 from aperture 110, thus releasing the coupling of support member 111 from cylinder 103. Nevertheless, since support members 111 and 112 are secured to drive shaft 102a, the rotation of drive shaft 102 in the direction of arrow C also rotates these support members in this same direction. Thus, guide members 105 and 106 slide out from the turns of wire 107, as shown in FIG. 12. Drive shaft 102 is rotated in the direction of arrow C by the same amount which it had been rotated previously in the direction of arrow A. That is, if the drive shaft had been rotated in the direction of arrow A by a predetermined angle in order to form the predetermined number of turns of wire 107 about the surface of cylinder 103, this drive shaft now is rotated by the same predetermined angle, but in the opposite direction, as indicated by arrow C. This returns guide members 105 and 106 to their respective, initial positions. Once in their initial positions, the angular position of drive shaft 102 with respect to cylinder 103 which, it is recalled, had been maintained stationary while drive shaft 102 had been rotated in the direction of arrow C, is such that ball 113 now is aligned with another aperture 110 and, under the bias force exerted thereon by spring 114, this ball is inserted into the aperture. Now, drive shaft 102 is permitted to resume rotation in the direction of arrow A, and cylinder 103 no longer is held stationary. Consequently, the rotation of drive shaft 102 rotates cylinder 103, by reason of releasable coupling 115 between the cylinder and support member 111, and guide members 105 and 106 likewise are rotated with the cylinder.

As the cylinder and guide members rotate in the direction of arrow A (FIGS. 8 and 11), flier 101 resumes its revolution in its fixed orbit so as to continue to wind wire 107 about guide members 105 and 106 and thus, to form skewed windings about the surface of cylinder 103. It is appreciated that the constant speed at which drive shaft 102 is rotated, and the constant speed at which flier 101 is revolved in synchronism with the drive shaft results in a uniform pitch of the turns of wire 107 which are formed.

If apertures 110 are spaced apart from each other by a distance corresponding to a pole width, as is preferred, then it is seen that guide members 105 and 106 are returned to their respective initial positions after a number of turns corresponding to the pole width are formed. That is, cylinder 103 and guide members 105 and 106 first are rotated in the direction of arrow A so that a complete pole width of turns are wound thereabout, and then the guide members are rotated in the direction of arrow C, relative to cylinder 103, so as to return them to their initial positions and to permit the winding of the next pole width about the surface of the cylinder. As a numerical example, the pole width may be provided with thirty turns, and after the thirtieth turn of wire 107 is wound about guide members 105 and 106, the guide members are returned to their initial positions so as to commence the formation of the next thirty-turn pole width. If desired, prior to returning guide members 105 and 106 to their initial positions, the turns of wire 107 which have been formed thereabout may be adhered to each other. For example, if wire 107 is provided with a thermoplastically adhesive insulating coating, heat may be applied to the turns of wire which are formed about the guide members such that these turns adhere to each other; and then the guide members can be returned to their respective, initial positions.

Figure 13:
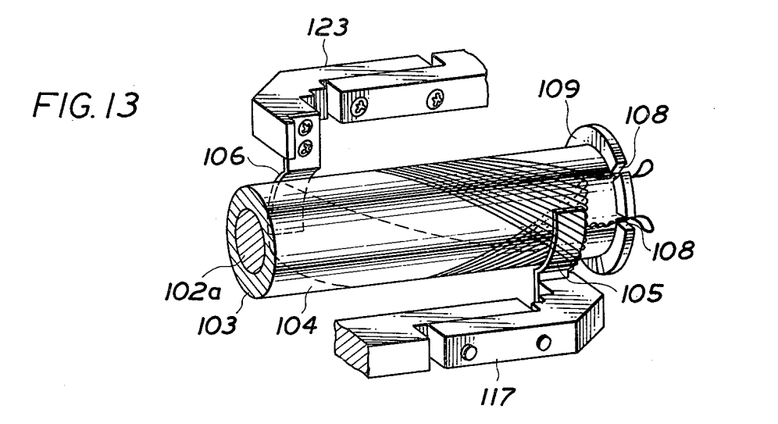
Figure 14:
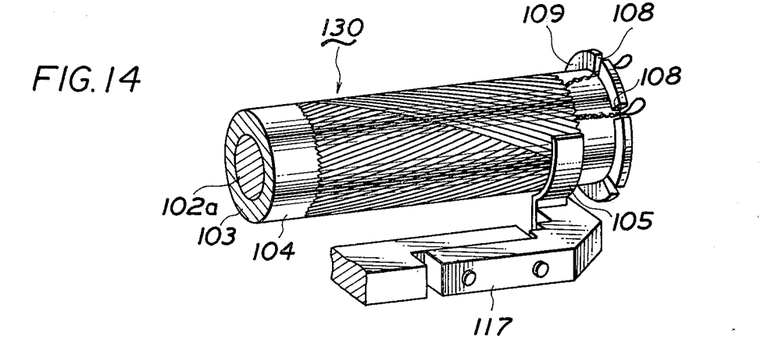

As shown in FIGS. 12 and 13, the last turn which is included in a pole width may have an end portion thereof twisted into a loop, and this loop then can be inserted into slot 108 of flange element 109 so as to define the end of one pole width and the beginning of the next. When this procedure is adopted for each pole width, the resultant winding 130 which is formed about the surface of cylinder 103 will appear as shown in FIG. 14, wherein the last turn in each pole width is twisted into a loop, and this loop is inserted into a respective slot 108 of flange element 109. This, of course, permits ready identification of the location of the respective pole widths, which is useful in further assembly of armature winding 130 in the electric machine with which it is to be utilized.

Figure 15:
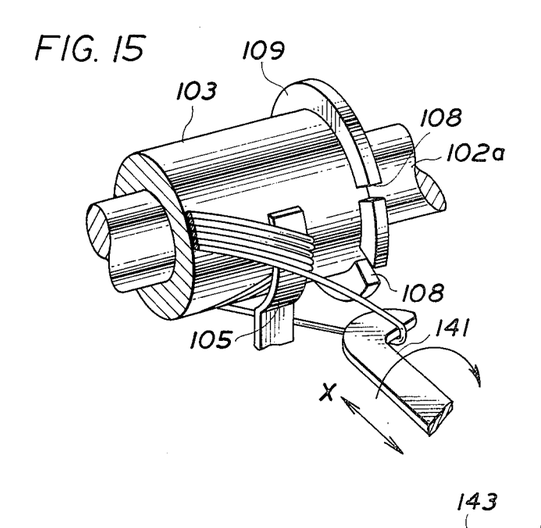
FIG. 15 is a perspective view of a portion of the apparatus showing, in addition, a device for forming the end of a pole-width of the winding.
Figure 17:
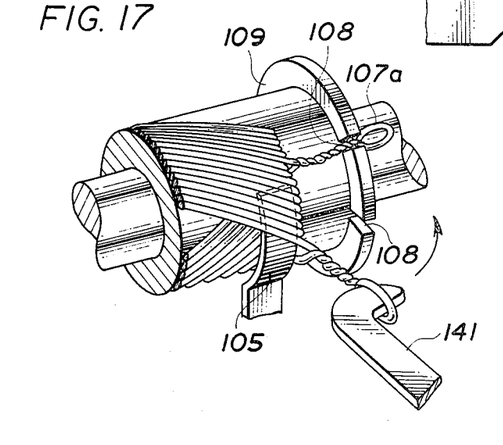
FIG. 17 is another perspective view showing the device for forming the end of a pole-width of turns.

One example of apparatus which can be used to form the aforementioned twisted loops in the last turn of a pole width is illustrated in FIGS. 15 and 17, and is comprised of a pawl member 141. Normally, i.e., when cylinder 103 and guide members 105 and 106 rotate in the direction of arrow A to wind wire 107 about the surface of the cylinder to form successive skewed turns, pawl member 141 is disposed in a retracted position so as not to interfere with this winding operation. However, as flier 101 revolves to pay out the last turn in the pole width, pawl member 141 is moved in the forward X direction (FIG. 15) so as to intercept this last turn. Hence, rather than being doubled back about guide member 105, as in the formation of the previous turns, the last turn in the pole width is doubled back over pawl member 141. Then, the pawl member is twisted, or rotated, about its longitudinal axis, so as to twist the intercepted end portion of this last turn into a loop, as shown in FIG. 17. Once this loop is formed, pawl member 141 then is advanced (as represented by the arrow in FIG. 17) so as to insert the loop of wire formed thereby into slot 108 in flange element 109. This twisting of pawl 141 to form the twisted loop in the end portion of the last turn of wire in the pole width, and this insertion of the twisted loop 107a into slot 108 may, in one embodiment, be carried out while cylinder 103 continues to rotate in the direction of arrow A.

Figure 16:
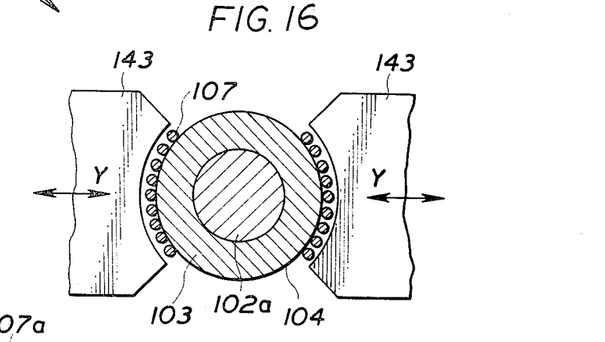
FIG. 16 is a sectional view of the apparatus representing one technique for adhering the turns of the coreless armature winding to each other.

The aforementioned step of adhering to each other the turns of wire 107 which constitute a pole width of the armature winding prior to the return of guide members 105 and 106 to their initial positions can be performed by a heat clamp 143, as shown in FIG. 16. This heat clamp, which is comprised of a pair of clamping members disposed on opposite sides of cylinder 103, is activated such that the pair of members are moved toward each other to encompass that portion of the armature winding which has been formed. Heat is applied from heat clamp 143 to wire 107 so as to heat the thermally energizable coating thereof. This, in turn, results in the thermal adhesion of the pole width of turns which have been formed about the surface of cylinder 103. After the thermally energizable coatings of wire 107 have been properly energized, heat clamp 143 is withdrawn from cylinder 103, and guide members 105 and 106 then are permitted to be rotated in the direction of arrow C to return to their respective initial positions. In another embodiment, this operation of heat clamp 143 can be carried out at the same time that pawl 141 is twisted to form the twisted loop 107a in the last turn included in a pole width.

As a numerical example, if it is assumed that the armature winding to be formed by the illustrated apparatus is a 5-pole winding, and that each pole width contains thirty turns of wire, then, after the twenty-ninth turn has been formed, pawl 141 is moved to intercept the thirtieth turn, and thus to form twisted loop 107a in this thirtieth turn. If desired, while twisted loop 107a is formed, and while heat clamp 143 energizes the thermally adhesive coating of wire 107, guide members 105 and 106 may be returned to their initial positions. This can be readily attained if the heat clamp is used, in addition to energizing the thermal adhesive coating of the wire, to maintain cylinder 103 stationary. Then, drive shaft 102 can be rotated in the direction of arrow C so as to return support members 111 and 112, and thus guide members 105 and 106, to their initial positions. Once this is attained, pawl member 141 can be advanced so as to insert twisted loop 107a into slot 108, heat clamp 143 can be withdrawn from cylinder 103, and the cylinder, together with guide members 105 and 106, then can be rotated in the direction of arrow A to form the turns of the next pole width. For a 5-pole armature winding, this operation is repeated successively until all five widths have been formed.

While the present invention has been particularly shown and described with reference to certain preferred embodiments, it should be readily appreciated that various and modifications in form and details may be made by one of ordinary skill in the art without departing from the spirit and scope of the invention. For example, in the embodiment shown in FIG. 1, the alternate indexing of indexing mechanisms 10A and 10B can be performed either manually or by suitable automated apparatus (not shown). Similarly, support member 21a and 21b can be pivoted about pivot axes 23a, 23b, respectively, either manually or by suitable control apparatus (not shown). Furthermore, the manner in which indexing mechanisms 10A and 10B are operated need not be limited solely to the use of pins 16a, 16b which pass through apertures 15a, 15b into aligned apertures 14a, 14b. Other suitable control mechanisms, such as stepping motors, or the like, can be used to drive indexing mechanisms 10A and 10B. Still further, and with reference to the embodiment shown in FIG. 8, after a predetermined number of turns have been formed about guide members 105 and 106, cylinder 103 can be held stationary and drive shaft 102 can be rotated in the reverse direction either manually or by suitable control apparatus (not shown). Also, pawl 141 and heat clamp 143 can be operated either manually or by appropriate control apparatus. Since all of the aforementioned control apparatus is well within the skill of one having ordinary skill in the art, and since such control apparatus forms no part of the present invention per se, detailed description thereof is not provided.

It is intended that the appended claims be interpreted as including these and other such changes and modifications.

What is claimed is:

1. A method of forming a coreless armature winding for an electric machine, comprising the steps of revolving a source of wire in a fixed orbit about a cylinder, the axis of said orbit being inclined with respect to the longitudinal axis of said cylinder; guiding said wire about first and second guide members positioned at opposite spaced apart locations on the surface of said cylinder and defining the opposite ends of the coreless armature winding so as to form one complete turn of said wire about said surface of said cylinder; rotating said cylinder about the longitudinal axis thereof in synchronism with the revolution of said wire, said cylinder being rotated by a predetermined angle corresponding to a pitch of the winding so that as said wire continues to revolve, successive skewed turns of said wire are formed on said surface of said cylinder; rotating said first and second guide member with the rotation of said cylinder; rotating said guide members relative to said cylinder for returning said first and second guide members to initial positions thereof after a predetermined number of turns have been formed repeating the aforementioned steps until the complete armature winding is formed; and removing said armature winding from said cylinder.

2. The method of claim 1 further comprising the step of securing the predetermined number of turns which have been formed prior to the returning of said first and second guide members to said initial positions thereof.

3. The method of claim 2 wherein said step of securing comprises thermally adhering said predetermined number of turns to each other.

4. The method of claim 1 wherein said step of returning said first and second guide members to initial positions thereof comprises returning said first guide member to its initial position after said wire revolves through approximately one-half its orbit and extends from said first guide member to said second guide member by rotating said first guide member relative to said cylinder by said predetermined angle, and returning said second guide member to its initial position after said wire revolves through the remainder of its orbit and extends from said second guide member to said first guide member by rotating said second guide member relative to said cylinder by said predetermined angle.

5. The method of claim 4 further comprising the step of temporarily securing the run of wire extending between said first and second guide members to said cylinder prior to the respective returning of each guide member to its initial position.

6. The method of claim 1 wherein said step of returning said first and second guide members to initial positions thereof comprises concurrently rotating both said first and second guide members relative to said cylinder by said predetermined angle after said wire revolves through a predetermined number of orbits.

7. The method of claim 6 further comprising the step of halting the rotation of said cylinder while said first and second guide members are returned to their initial positions.

8. The method of claim 7 further comprising the step of thermally adhering the predetermined number of turns to each other prior to returning said first and second guide members to their initial positions.

9. Apparatus for forming a coreless armature winding for an electric machine, comprising:
a revolvable source of wire;
a rotatable cylinder, said source of wire being revolvable in an orbit about said cylinder, said orbit having an axis of revolution that is inclined with respect to the longitudinal axis of said cylinder;
means for rotating said cylinder about the longitudinal axis thereof in synchronism with the revolution of said source of wire;
first and second guide means disposed at spaced apart locations on the surface of said cylinder to define the opposite ends of said armature winding, said first and second guide means being rotatable with said cylinder, and said first and second guide means intercepting said wire as said source of wire revolves about said cylinder so as to establish respective double back points for each turn of wire; and
means for rotating said first and second guide means relative to said cylinder in a direction opposite to the direction of rotation of said cylinder and through a predetermined angle, after a predetermined number of turns of said wire has been formed on said cylinder, to return said first and second guide means to respective initial positions to intercept said wire again.

10. The apparatus of claim 9 wherein said means for rotating said first and second guide means comprises first and second indexing means coupled to said first and second guide means, respectively, each of said indexing means being rotatable by (1/N)th of a complete rotation of said cylinder after a single turn of wire has been formed, wherein N is the total number of turns of wire formed on said cylinder.

11. The apparatus of claim 10 wherein said first and second indexing means are operative alternately, said first indexing means being operative after said revolvable source of wire completes the first half of its orbit and said second indexing means being operative after said revolvable source of wire completes the second half of its orbit.

12. The apparatus of claim 11 wherein each of said guide means comprises a pin pivotable about a pivot axis into contact with the surface of said cylinder to intercept said wire as said source revolves about said cylinder, and pivotable about said axis away from said surface of said cylinder when returned to said initial position.

13. The apparatus of claim 12 wherein each said indexing means comprises a first flange member coupled to said means for rotating said cylinder and rotatable with said cylinder; a second flange member coaxial with and rotatable relative to said first flange member, said respective guide means being coupled to said second flange member; and coupling means for coupling said second flange member to said first flange member.

14. The apparatus of claim 13 wherein said second flange member is provided with a circular array of uniformly spaced apertures; and said coupling means comprises at least one coupling pin provided on said first flange member and insertable into successive ones of said apertures.

15. The apparatus of claim 14 wherein said apertures are spaced apart by a distance related to the pitch of said winding.

16. The apparatus of claim 9 wherein said means for rotating said first and second guide means comprises a rotatable drive shaft coaxial with said cylinder; a first support member mounted on said drive shaft for supporting said first guide means; releasable coupling means for coupling said first support member to said cylinder so as to rotate said cylinder when said first support member is rotated by said drive shaft; and a second support member mounted on and rotated with said drive shaft for supporting said second guide means; said drive shaft being rotated in said opposite direction relative to said cylinder after said predetermined number of turns of said wire has been formed so as to thereby rotate said first and second guide means.

17. The apparatus of claim 16 wherein said cylinder is provided with a circular array of apertures on the surface thereof; and said releasable coupling means comprises a ball insertable in said apertures and means for urging said ball into an aperture when said aperture is aligned therewith.

18. The apparatus of claim 17 wherein said apertures are spaced apart from each other by an angular distance corresponding to a pole width of said armature winding, whereby said drive shaft is rotated in said opposite direction after a number of turns of wire corresponding to a pole width has been wound on said cylinder and about said first and second guide means.

19. The apparatus of claim 17 wherein said second support member is provided with a tongue; and said drive shaft is provided with a groove along the diameter of its cross-section for receiving said tongue and to rotate said second support member as said drive shaft rotates.

20. The apparatus of claim 16 wherein each of said guide means is comprised of an arcuate member coupled to a respective one of said first and second support members, said arcuate member being adjacent said cylinder and concentric therewith.

21. The apparatus of claim 20 wherein each of said first and second support members comprises a base coupled to said drive shaft and a support arm extending from said base in a direction generally parallel to the longitudinal axis of said cylinder; said arcuate member being supported on said support arm.

22. The apparatus of claim 20 further comprising a flange member mounted on one end of said cylinder, said flange member having a number of spaced apart sections corresponding to the number of poles of said electric machine; and pawl means for intercepting the last turn of said predetermined number of turns of said wire in a pole width so as to prevent said last turn from being wound about a respective one of said arcuate members, said pawl means being rotatable to form a loop at the intercepted portion of said last turn, and said loop being insertable in the spacing between two adjacent sections of said flange member.

23. Apparatus for forming a coreless armature winding for an electric machine, comprising:
a revolvable source of wire;
a rotatable cylinder, said source of wire being revolvable in an orbit about said cylinder, said orbit having an axis of revolution that is inclined with respect to the longitudinal axis of said cylinder;

means for rotating said cylinder about the longitudinal axis thereof in synchronism with the revolution of said source of wire;

first and second guide means disposed at spaced apart locations on the surface of said cylinder to define the opposite ends of said armature winding, said first and second guide means being rotatable with said cylinder and intercepting said wire as said source of wire revolves about said cylinder so as to establish respective double back points for each turn of wire, and each of said guide means including an arcuate member adjacent to said cylinder and concentric therewith;

means for rotating said first and second guide means relative to said cylinder in a direction opposite to the direction of rotation of said cylinder and through a predetermined angle, after a predetermined number of turns of said wire has been formed on said cylinder, to return said first and second guide means to respective initial positions to intercept said wire again, said means for rotating said first and second guide means comprising a rotatable drive shaft coaxial with said cylinder; a first support member mounted on said drive shaft and coupled to said arcuate member of said first guide means for supporting said first guide means; releasable coupling means for coupling said first support member to said cylinder so as to rotate said cylinder when said first support member is rotated by said drive shaft; and a second support member mounted on and rotated with said drive shaft and coupled to said arcuate member of said second guide means for supporting said second guide means, said drive shaft being rotated in said opposite direction relative to said cylinder after said predetermined number of turns of said wire has been formed so as to thereby rotate said first and second guide means;

a flange member mounted on one end of said cylinder, said flange member having a number of spaced apart sections corresponding to the number of poles of said electric machine;

pawl means for intercepting the last turn of said predetermined number of turns of said wire in a pole width so as to prevent said last turn from being wound about a respective one of said arcuate members, said pawl means being rotatable to form a loop at the intercepted portion of said last turn, and said loop being insertable in the spacing between two adjacent sections of said flange member; and means for adhering all of said predetermined number of turns of said wire in a pole width to each other prior to returning said arcuate members to said respective initial positions thereto.

* * * * *